(12) United States Patent
Rao et al.

(10) Patent No.: US 7,984,485 B1
(45) Date of Patent: Jul. 19, 2011

(54) INGESTION INTERFACE FOR TRANSFERRING UPDATE PACKAGE CONTAINERS INTO A DISTRIBUTION NETWORK

(75) Inventors: Bindu R. Rao, Laguna Niguel, CA (US); Vivek Kapadekar, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 917 days.

(21) Appl. No.: 11/047,212

(22) Filed: Jan. 31, 2005

Related U.S. Application Data (60) Provisional application No. 60/540,882, filed on Jan. 29, 2004.

(51) Int. Cl.
*G06F 7/04* (2006.01)
(52) U.S. Cl. ............................. 726/3; 713/170; 717/174
(58) Field of Classification Search ...... 726/3; 713/170; 717/174
See application file for complete search history.

(56) References Cited

U.S. PATENT DOCUMENTS

| | | | |
|---|---|---|---|
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,878,256 A | 3/1999 | Bealkowski et al. | |
| 5,887,253 A * | 3/1999 | O'Neil et al. ................. | 455/418 |
| 5,960,445 A | 9/1999 | Tamori et al. | |
| 6,009,497 A | 12/1999 | Wells et al. | |
| 6,038,636 A | 3/2000 | Brown, III et al. | |
| 6,064,814 A | 5/2000 | Capriles et al. | |
| 6,073,206 A | 6/2000 | Piwonka et al. | |
| 6,073,214 A | 6/2000 | Fawcett | |
| 6,088,759 A | 7/2000 | Hasbun et al. | |
| 6,105,063 A | 8/2000 | Hayes, Jr. | |
| 6,112,024 A | 8/2000 | Almond et al. | |

(Continued)

FOREIGN PATENT DOCUMENTS

CA 2339923 3/2000

(Continued)

OTHER PUBLICATIONS

"Focus on OpenView a guide to Hewlett-Packard's Network and Systems Management Platform", Nathan J. Muller, pp. 1-291, CBM Books, published 1995.

(Continued)

*Primary Examiner* — Kambiz Zand
*Assistant Examiner* — Amare Tabor (57) ABSTRACT

Aspects of the present invention may be seen in a method and system for the ingestion of update package containers (or other types of containers, in general) into a distribution network. In an embodiment of the present invention, update package containers (UPC) from several different sources may be transferred into a distribution network such as a carrier network via a standardized SOAP interface. A logical repository may be assumed to exist in the distribution network. A standardized interface to such a logical repository may facilitate the integration of ingestion methods from several software originators into such a distribution network.

30 Claims, 2 Drawing Sheets

U.S. PATENT DOCUMENTS

| | | | |
|---|---|---|---|
| 6,112,197 | A | 8/2000 | Chatterjee et al. |
| 6,126,327 | A | 10/2000 | Bi et al. |
| 6,128,695 | A | 10/2000 | Estakhri et al. |
| 6,134,548 | A * | 10/2000 | Gottsman et al. ............... 707/5 |
| 6,157,559 | A | 12/2000 | Yoo |
| 6,163,274 | A | 12/2000 | Lindgren |
| 6,198,946 | B1 | 3/2001 | Shin et al. |
| 6,279,153 | B1 | 8/2001 | Bi et al. |
| 6,311,322 | B1 | 10/2001 | Ikeda et al. |
| 6,438,585 | B2 | 8/2002 | Mousseau et al. |
| 6,493,871 | B1 * | 12/2002 | McGuire et al. ............. 717/173 |
| 6,546,492 | B1 * | 4/2003 | Walker et al. ..................... 726/3 |
| 7,272,711 | B2 * | 9/2007 | Suda et al. ..................... 713/100 |
| 7,346,683 | B2 * | 3/2008 | Inoue .......................... 709/225 |
| 7,353,533 | B2 * | 4/2008 | Wright et al. ..................... 726/1 |
| 7,480,907 | B1 * | 1/2009 | Marolia et al. ................. 717/174 |
| 7,810,088 | B2 * | 10/2010 | Herle et al. ................... 717/173 |
| 2001/0029178 | A1 | 10/2001 | Criss et al. |
| 2001/0047363 | A1 | 11/2001 | Peng |
| 2001/0048728 | A1 | 12/2001 | Peng |
| 2002/0078209 | A1 | 6/2002 | Peng |
| 2002/0116261 | A1 | 8/2002 | Moskowitz et al. |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 * | 10/2002 | Anton, Jr. ..................... 717/178 |
| 2002/0161658 | A1 * | 10/2002 | Sussman .......................... 705/26 |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2004/0205709 | A1 * | 10/2004 | Hiltgen et al. ................. 717/115 |
| 2005/0022175 | A1 * | 1/2005 | Sliger et al. ................... 717/169 |
| 2005/0091367 | A1 * | 4/2005 | Pyhalammi et al. .......... 709/224 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

Fig. 1

INGESTION INTERFACE FOR TRANSFERRING UPDATE PACKAGE CONTAINERS INTO A DISTRIBUTION NETWORK

RELATED APPLICATIONS

This patent application makes reference to, claims priority to and claims benefit from U.S. Provisional Patent Application Ser. No. 60/540,882, entitled "Ingestion Interface for Transferring Update Package Containers into a Distribution Network," filed on Jan. 29, 2004.

The complete subject matter of the above-referenced United States Provisional Patent Application is hereby incorporated herein by reference, in its entirety. In addition, this application makes reference to U.S. Provisional Patent Application Ser. No. 60/513,848, entitled "Update Package Container", filed Oct. 22, 2003, U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Problems often arise while conducting updates of firmware/software in such electronic devices, problems such as, for example, managing the millions of devices that require firmware upgrades and provisioning of applications. Sometimes there can be problems in determining the existing firmware version of devices and mapping them to device capabilities. In some deployments, it is often unclear what the end points are, and providing end-to-end security is often troublesome and nearly impossible. Servers are often subject to replay attacks, and as a result security systems need to be able to guard against replay attacks, etc.

Generally, more than one carrier network, each with its own ingestion mechanisms, is supported by a manufacturer of an electronic device or by a software company providing mobile software. Some carriers do not have automated ingestion mechanisms and an administrator would load a compact disc (CD) into a server to transfer content that is to be disseminated or tested. Some carriers have to support a plurality of data transfer mechanisms and interfaces, one for each software company they interact with or one for each electronic device manufacturer they deal with.

Typically, electronic device manufacturers deal with several carriers, and they have to deliver content such as firmware code, bug fixes, etc. to the carriers for dissemination via the carrier network. The electronic device manufacturers often waste a lot of resources getting the content translated into different formats and put on different media (CDs, tape, diskettes, etc.) for transfer.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system and method that facilitate a secure ingestion of updating information into a network. The method may comprise registering at least one of a plurality of sources of updating information; providing the at least one of the plurality of sources with authentication information; receiving a request from the at least one of the plurality of sources, utilizing the provided authentication information, to transfer a container of updating information; and downloading the container of updating information from the at least one of the plurality of sources.

In an embodiment of the present invention, the container of updating information may comprise at least one set of updating information associated with electronic devices associated with the network. The updating information may comprise executable commands that convert firmware in the electronic devices from a first version to a second version.

In an embodiment of the present invention, the authentication information may be used for establishing at least one of a secured sockets layer (SSL) and a transport layer security (TLS) link. The authentication information may comprise a digital certificate.

In an embodiment of the present invention, the method may further comprise processing the downloaded container of updating information, and determining a condition of the downloaded container of updating information. The condition may comprise at least one of at least one error associated with the downloaded container of updating information, and an error-free condition of the downloaded container of updating information. When the condition comprises an error-free condition, the method may further comprise preparing the updating information for delivery to the electronic devices.

In an embodiment of the present invention, the method may also comprise one of delivering the determined condition to the at least one of the plurality of sources, and notifying the at least one of the plurality of sources of the existence of the determined condition and allowing the at least one of the plurality of sources to retrieve the determined condition.

The system may comprise devices and components capable of performing the method as described hereinabove that facilitates a secure ingestion of updating information into a network. The system may comprise an ingestion interface and a repository device. The ingestion interface may register at least one of a plurality of sources of updating information and provide the at least one of the plurality of sources with authentication information. The repository device may receive a request from the at least one of the plurality of sources, utilizing the provided authentication information, to transfer a container of updating information, and downloads through the ingestion interface the container of updating information from the at least one of the plurality of sources.

The repository device may also process the downloaded container of updating information, and determine a condition of the downloaded container of updating information. The repository device may deliver the determined condition to the at least one of the plurality of sources, or notify the at least one of the plurality of sources of the existence of the determined condition and allows the at least one of the plurality of sources to retrieve the determined condition.

In an embodiment of the present invention, the at least one of the plurality of sources may comprise at least one of an originator and a manufacturer of software for electronic devices associated with the network.

Aspects of the present invention may also been seen in an interface that facilitates downloading of updating information into a carrier network. The interface may enable registration of at least one of a plurality of sources of updating information, and secure downloading of at least one container of updating information from the at least one of the plurality of sources. The at least one container of updating information may comprise at least one set of updating information for updating associated electronic devices via the carrier network.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to updating of firmware/software in an electronic device such as, for example, a mobile handset in a carrier network using a device management solution. More specifically, the present invention relates to ingestion of firmware/software update packages or other content into a distribution network such as, for example, a telecom carrier network. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
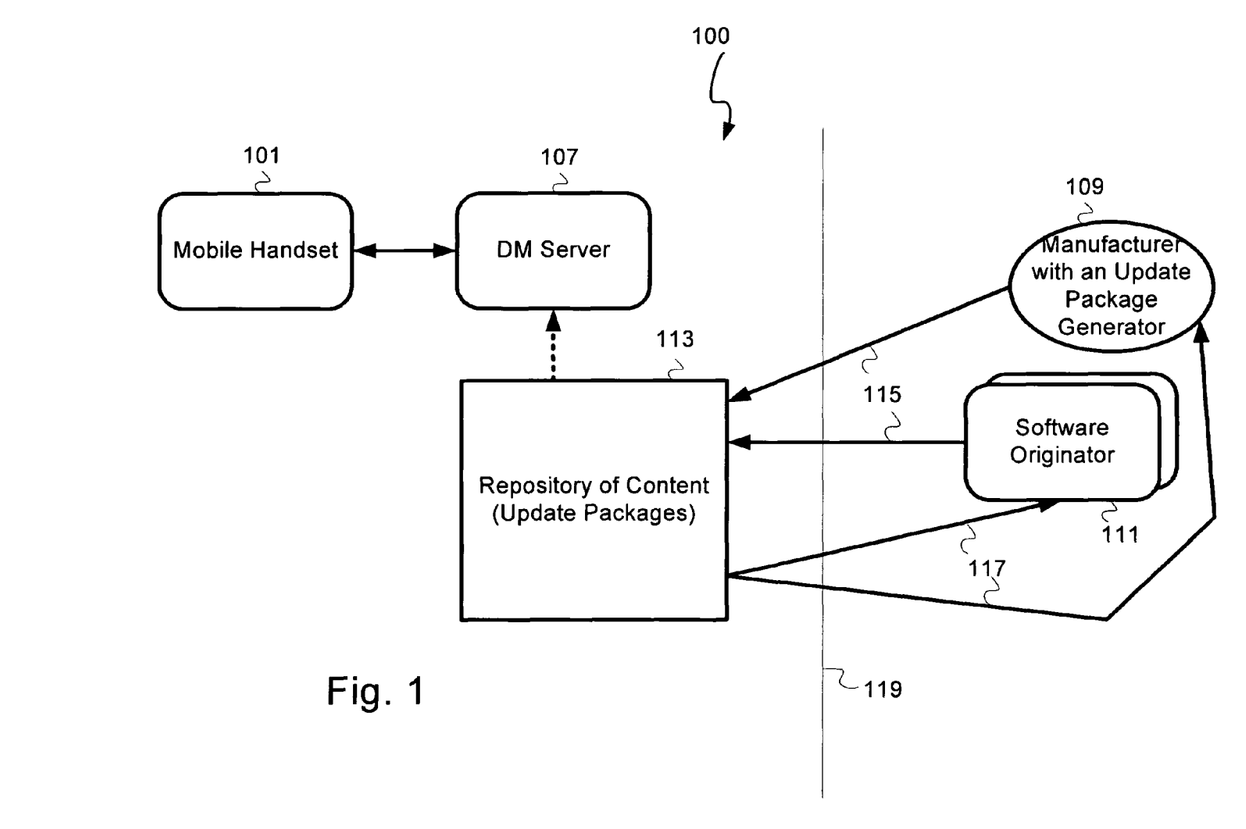
FIG. 1 illustrates a block diagram of a distribution network, in accordance with an embodiment of the present invention.

FIG. 1 illustrates a block diagram of a distribution network 100, in accordance with an embodiment of the present invention. The distribution network 100 may be, for example, a mobile handset network comprising a device management (DM) server 107 and a repository of content 113. The distribution network 100 may employ the DM server 107 to disseminate content such as, for example, update packages for firmware updates in mobile handsets such as, for example, mobile handset 101. The update packages may be received in update package containers 115 delivered via an interface such as, for example, a simple object access protocol (SOAP) interface by software originators 111 or manufacturers 109, which may be outside the distribution network 100 and may communicate with the distribution network 100 via an ingestion interface 119. In an embodiment of the present invention, an update package may comprise executable instructions used to convert firmware/software from one version to another in electronic devices such as, for example, a mobile handset. In an embodiment of the present invention, the distribution network 100 may be a carrier network. In an embodiment of the present invention, the software originator 111 may be, for example, a third party software developer, a game producer, or an application producer. In an embodiment of the present invention, the manufacturer 109 may be, for example, a manufacturer of the mobile handset 101.

In an embodiment of the present invention, the ingestion of containers such as, for example, update package containers 115 into a distribution network such as, for example, the distribution network 100, may be standardized. Update package containers (UPC) 115 from several different sources (e.g., the manufacturer 109 or software originators 111) may be transferred into the distribution network 100. In an embodiment of the present invention, a logical repository may exist in the distribution network 100. A standardized ingestion interface 119 to such a logical repository like repository of content 113, for example, may be utilized to facilitate the integration of ingestion methods from several software originators into the distribution network 100. In an embodiment of the present invention, the ingestion interface 119 may facilitate the depositing of UPCs 115 and the retrieval of detailed results 117 of the ingestion.

In an embodiment of the present invention, the results 117 may be generated for each of the UPCs 115. The results 117 may indicate whether the corresponding UPC may contain any errors. If a UPC is found to contain any errors, the results 117 may indicate so and be sent to the source corresponding to the UPC, where the source may be, for example, the manufacturer 109 or software originators 111.

In an embodiment of the present invention, the deposit of an update package may utilize an extensible markup language (XML) document such as, for example, the UPC 115, which may be deposited along with a parameter that may indicate an associated state of ingestion. For example, the software originators 111 may want to request that the content being deposited be initialized into a "test" state or into a "ready for deployment" state. The state of an update package may be deemed, by default, to be the "test" state. Other exemplary states, in addition to "test" and "ready for deployment" may include, for example, an "active" state, an "inactive" state, and a "deleted" state. The valid states of an update package may be specified by a life-cycle management component in the distribution network 100, or may be specified and managed by an administrator, for example.

In an embodiment of the present invention, results 117 of an ingestion process may be gathered by the repository of content 113 and made available to the manufacturer 109 or software originators 111 via a retrieval mechanism that provides detailed results 117, which may then be conveyed to the software originator 111.

The ingestion interface 119 may, in addition to deposit and retrieval activities, provide a "registration" activity that enables a software originator 111, for example, to register with the distribution network 100. As part of registration, a software originator 111 or manufacturer 109 may, for example, receive a digital certificate to be used for authenticated communication with the distribution network 100. The digital certificate may be created in response to the registration of the sources of the UPCs in the distribution network 100, and the sources (i.e., the manufacturer 109 or software originators 111) may then retrieve the appropriate certificate.

In an embodiment of the present invention, the certificate may be utilized by the associated source as a form of authentication to the repository of content 113, such that UPCs from unregistered sources or origin may not be stored and distributed in the distribution network 100. In an embodiment of the present invention, a certificate corresponding to an associated source (the manufacturer 109 or software originators 111) may be utilized to authenticate the associated source to allow transport of UPCs from the associated source for one session. In another embodiment of the present invention, a certificate corresponding to an associated source (the manufacturer 109 or software originators 111) may be utilized to authenticate the associated source to allow transport of UPCs from the associated source every time a UPC is transported from the source to the distribution network 100. In an embodiment of the present invention, the certificate may be utilized to authenticate establishing a link for transporting UPCs 115. The link may be, for example, a SSL link or a transport layer security (TLS) link.

In an embodiment of the present invention, the ingestion interface 119 may be supported via the SOAP mechanism or, for example, a hypertext transfer protocol (HTTP) means. A SOAP client may make a SOAP binding and make a SOAP call to pass the UPC XML or post the UPC XML to a secure universe resource locator (URL). In an embodiment of the present invention, the SOAP client may be located at a source (the manufacturer 109 or software originators 111) of the UPCs.

In an embodiment of the present invention, the UPC 115 may comprise an attribute that defines, for example, whether a deposit activity is an atomic transaction (i.e., whether all components of the transaction are present and processed at once). In an embodiment of the present invention, this approach may allow the software originator 111, which is expected to know more about the content of the UPC 115 than the recipient, to specify whether the deposit of the UPC 115 is an "all-or-nothing" type of transaction, or to specify a deposit of a UPC 115 comprising a "do-what-you-can" type of transaction.

In an embodiment of the present invention, an ingestion interface 119 between the distribution network 100 and the rest of the world may be, for example, a SOAP-based ingestion interface 119, that may also be referred to as "SOAP curtain," which may provide remote access to an ingestion service that takes an UPC 115 in XML format as an input, and returns a result 117. The result 117 may comprise a jobID and resultcode, for example. A "deposit" command with two parameters, the first one being the UPC 115 in XML format and the second one being a "numeric" code indicating a recommended state, may be utilized. The response to the "deposit" command may be an XML message that contains the jobID and resultcode to a remote SOAP client such as, for example, the software originator 111 or manufacturer 109.

The details of what transpires during the ingestion process may be retrieved via a "getDetails" command, which may retrieve the details of success or failure encountered during the processing of each of the components included in the UPC 115. The results may be provided in XML format, for example. The parameters for "getDetails" may include the jobID received from a previous "deposit" command.

In an embodiment of the present invention, the SOAP client that invokes the "deposit" command may not be the one the subsequently invokes the "getDetails" command. Security may be ensured by appropriate security mechanisms that may be incorporated.

The result codes returned by the SOAP server, which may be located in the repository of content 113, as a result of the SOAP client invoking the "deposit" command may include the following codes and the associated results:

0: Valid and Successful
1: Invalid XML or DTD
2: Valid but data corrupt
3: Well-formed but does not conform to DTD
4: Unauthorized access The registration by a software originator 111 with the distribution network 100 may result in dispensing a digital certificate that the software originator 111, for example, may subsequently employ as a secured sockets layer (SSL) certificate for mutual authentication. Apart from secure transport layer security, there may be additional authorization security as well, to prevent unauthorized access through the ingestion interface (i.e., SOAP curtain) 119, and stop illegal deposits of UPCs 115.

In an embodiment of the present invention, the registration of a content provider such as, for example, the software originators 111 or manufacturers 109 may be a one-time registration event. This event may register the content providers (e.g., the manufacturers 109 and software originators 111) with the repository of content 113. Upon successful registration, a digital certificate may be issued to the content providers and may be used for future interactions. The digital certificate may also provide assistance with the identification and authentication of the service consumer while also preventing malicious attacks. In an embodiment of the present invention, the service consume may be, for example, the manufacturer 109 or software originators 111.

In an embodiment of the present invention, a "registration( )" SOAP call may be provided to enable the content generators (e.g., the manufacturers 109 and software originators 111) to register with the repository of content 113 in the distribution network 100. Upon successful registration, the content generators may invoke "deposit" calls. As such, a registered software originator 111 may initiate the deposit transaction; otherwise, invocation of a "deposit" call may be rejected with an "Unauthorized" result code.

In an embodiment of the present invention, web services may be utilized for communication between a requester entity such as, for example, a distribution network 100 and a provider entity such as, for example, a content generator (e.g., the manufacturers 109 and software originators 111).

Figure 2:
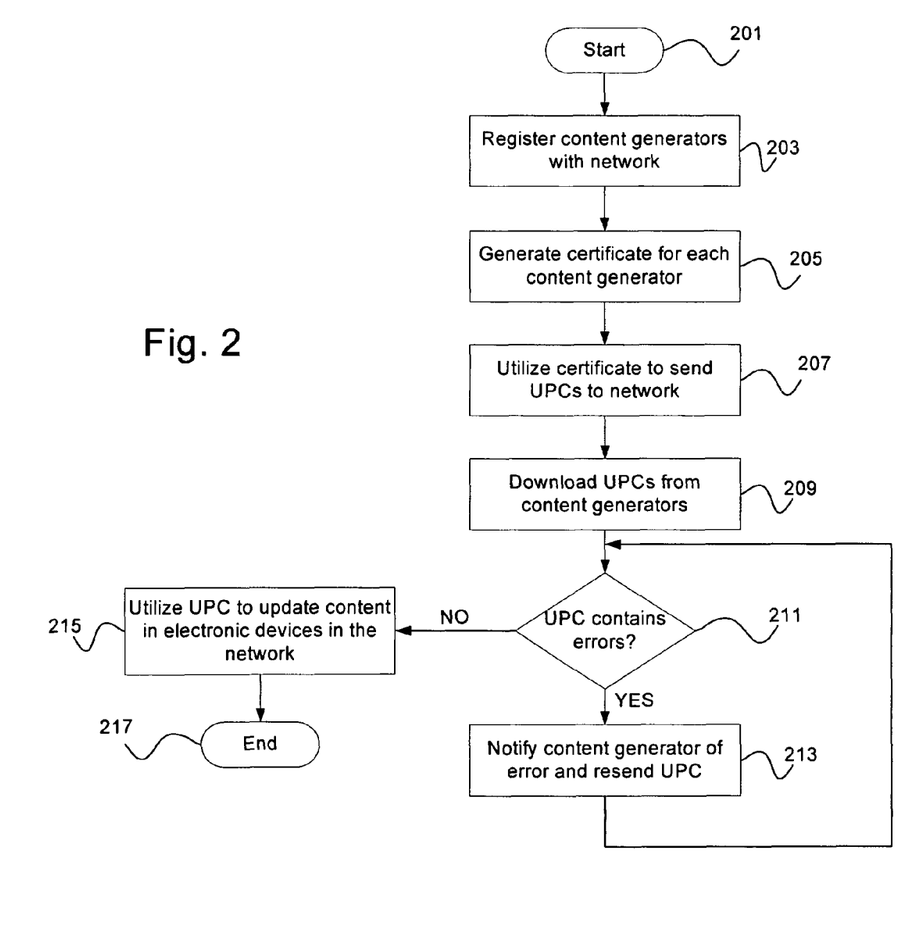
FIG. 2 illustrates a flow diagram of an exemplary method of secure delivery of updated packages to a distribution network, in accordance with an embodiment of the present invention.

FIG. 2 illustrates a flow diagram of an exemplary process of secure delivery of updated packages to a distribution network, in accordance with an embodiment of the present invention. The process may begin at a start block 201. At a next block 203, content generators such as, for example, manufacturers 109 and software originators 111 of FIG. 1, may register with the distribution network, which may be for example, the distribution network 100 for FIG. 1. In response to the registration process, certificates may be generated for each of the content generators at a next block 205. The certificates may be utilized as verification tools to ensure secure transports between the content generators and the distribution network. At a next block 207, the content generators may utilize the certificates to send UPCs to the distribution network. Upon verification of the content generators via the certificate, UPCs may be downloaded from content generators through an ingestion interface at a next block 209. The distribution network may then utilize appropriate tools to determine whether a received UPC may contain errors at a decision block 211. If any errors are detected, a notification may be sent to the content generator at a next block 213, so that the content generator may re-send the UPC error-free, and return to block 211 to determine whether the newly sent UPC contains any errors. If no errors are detected at the decision block 211, the downloaded UPC may be utilized appropriately to update content in electronic devices associated with the distribution network at a next block 215. The process may then end at an end block 217.

The terms "command", "call", and "message" may be used to indicate requests sent to the web server. For example, SOAP is a communications protocol, made up of messages that may convey commands. A "deposit" call may be used to cause the sending of a "deposit" message comprising a "deposit" command and associated parameters, to the SOAP server.

The following illustrates an exemplary SOAP "deposit" message:

```
<SOAP-ENV:Envelope
    xmlns:SOAP-ENV="http://schemas.xmlsoap.org/soap/
        envelope/">
    <SOAP-ENV:Body>
        <m:deposit xmlns:m="http://www.otaff.com/inges-
            tion">
            <UPC> the UPC container goes here </UPC>
            <ingestionstate>TEST</ingestionstate >
        </m:deposit >
    </SOAP-ENV:Body>
</SOAP-ENV:Envelope>
```

The following illustrates an exemplary document type definition (DTD) for the SOAP "deposit" command interface:

The DTD of the Response XML returned by the "deposit" interface is as shown below

```
<?xml version="1.0" encoding="UTF-8"?>
<!ELEMENT Response(jobid, resultcode, description)>
<!ELEMENT description (#PCDATA)>
<!ELEMENT jobid (#PCDATA)>
<!ELEMENT resultcode (#PCDATA)>
```

The following illustrates an exemplary SOAP getDetails message:

```
<SOAP-ENV:Envelope
    xmlns:SOAP-ENV="http://schemas.xmlsoap.org/soap/
        envelope/"> <SOAP-ENV:Body>
    <m:getDetails xmlns:m="http://www.otaff.com/inges-
        tion">
        <JOBID> JobId from previous deposit command is
            entered here
        </JOBID>
    </m:getDetails >
    </SOAP-ENV:Body>
</SOAP-ENV:Envelope>
```

The following illustrates an exemplary DTD for an update package container (UPC):

```
<!DOCTYPE UPDATEPACKAGECONTAINER PUBLIC
[
<!-- ==========================================-->
<!-- THE UPDATEPACKAGECONTAINER STRUCTURE    -->
<!-- ==========================================-->
<!ELEMENT    UPC    (UPDATEPACKAGECONTAINER, MIME
TYPE, ds:Signature) >
<!ATTLIST    UPC xmlns:ds CDATA #FIXED
http://www.w3.org/2000/09/xmldsig# >
<!ELEMENT    UPDATEPACKAGECONTAINER (DESCRIPTION,
DEVICE+)>
<!ATTLIST UPDATEPACKAGECONTAINER Id ID #IMPLIED>
<!ELEMENT    DEVICE (DESCRIPTION, MANUFACTURER,
MODEL, DEPLOYMENT,TARGET+) >
<!ELEMENT    TARGET (TRANSITION+) >
<!ATTLIST    TARGET name CDATA #REQUIRED>
<!ELEMENT    MANUFACTURER (#PCDATA) >
<!ELEMENT    MODEL (#PCDATA) >
<!ELEMENT    DEPLOYMENT (#CDATA) >
<!ELEMENT    TRANSITION (ORIGINALVERSION,
UPDATEDVERSION,
UPKG) >
<!ELEMENT    ORIGINALVERSION (#PCDATA) >
<!ELEMENT    UPDATEDVERSION (#PCDATA) >
<!ELEMENT    UPKG (UPDATEPACKAGE, UPDATETYPE,
ds:Signature)>
<!ELEMENT    UPDATEPACKAGE (NAME, DESCRIPTION,
                VENDOR*, PARAMETERS*,
CREATIONDATE, SIZE,
DOWNLOADTIME, REFLASHTIME,
DATATYPE, (DATA | PACKAGE | REFERENCE),
UPDATEPURPOSE, SEVERITY) >
<!ATTLIST UPDATEPACKAGE Id ID #IMPLIED>
<!ELEMENT    PACKAGE (DATA) >
<!ELEMENT    REFERENCE (#CDATA)>
<!ELEMENT    NAME (#PCDATA) >
<!ELEMENT    DESCRIPTION (#CDATA) >
<!ELEMENT    VENDOR (VENDORNAME, VENDORDETAILS,
PARAMETERS* ) >
<!ELEMENT    VENDORNAME (#CDATA) >
<!ELEMENT    VENDORDETAILS (#CDATA) >
<!ELEMENT    PARAMETERS (PARAMETER*) >
<!ELEMENT    PARAMETER (PARAMETERNAME,
PARAMETERVALUE) >
<!ELEMENT    PARAMETERNAME (#CDATA) >
<!ELEMENT    PARAMETERVALUE (#PCDATA) >
<!ELEMENT    CREATIONDATE (#PCDATA) >
<!ELEMENT    SIZE (#PCDATA)>
<!ELEMENT    DOWNLOADTIME (#PCDATA)>
<!ELEMENT    REFLASHTIME (#PCDATA)>
<!ELEMENT    DATATYPE (#PCDATA)>
<!ELEMENT    DATA (#PCDATA)>
<!ELEMENT    UPDATETYPE (#CDATA)>
<!ELEMENT    UPDATEPURPOSE (#CDATA)>
<!ELEMENT    SEVERITY (#PCDATA)>
```

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that facilitates a secure ingestion of updating information into a network, the method comprising:
registering at the network a source of updating information outside the network in response to a registration request from the source to the network;
providing the source of updating information with authentication information in response to the registering;
receiving a request at the network from the source of updating information, utilizing the provided authentication information, to transfer a container of updating information into the network, wherein the container of updating information is configured to update at least one of firmware and software in electronic devices associated with the network; and
downloading the container of updating information into the network from the source of updating information.

2. The method according to claim 1 wherein the container of updating information comprises a set of updating information associated with the electronic devices associated with the network.

3. The method according to claim 1 wherein the updating information comprises executable commands that convert the at least one of firmware and software in the electronic devices associated with the network from a first version to a second version.

4. The method according to claim 1 wherein the authentication information is used for establishing at least one of a secured sockets layer (SSL) and a transport layer security (TLS) link.

5. The method according to claim 1 wherein the authentication information comprises a digital certificate.

6. The method according to claim 1 further comprising:
processing the downloaded container of updating information; and
determining a condition of the downloaded container of updating information.

7. The method according to claim 6 wherein the condition comprises at least one error associated with the downloaded container of updating information, or an error-free condition of the downloaded container of updating information.

8. The method according to claim 7 wherein if the condition comprises an error-free condition, the method further comprises preparing the updating information for delivery to the electronic devices.

9. The method according to claim 6 further comprising one of:
delivering the determined condition to the source of updating information; and
notifying the source of updating information of the existence of the determined condition and allowing the source of updating information to retrieve the determined condition.

10. A system that facilitates a secure ingestion of updating information into a network, the system comprising:
an ingestion interface in the network that registers a source of updating information in response to a registration request from the source, and provides the source of updating information with authentication information in response to the registering; and
a repository device in the network that receives a request from the source of updating information, utilizing the provided authentication information, to transfer a container of updating information configured to update at least one of firmware and software in electronic devices associated with the network, and downloads the container of updating information from the source of updating information through the ingestion interface to the repository device.

11. The system according to claim 10 wherein the container of updating information comprises a set of updating information associated with the electronic devices associated with the network.

12. The system according to claim 11 wherein the updating information comprises executable commands that convert the at least one of firmware and software in the electronic devices associated with the network from a first version to a second version.

13. The system according to claim 10 wherein the certificate of authentication is used for establishing at least one of a secured sockets layer (SSL) and a transport layer security (TLS) link.

14. The system according to claim 10 wherein the authentication information comprises a digital certificate.

15. The system according to claim 10 wherein the repository device further:
processes the downloaded container of updating information; and
determines a condition of the downloaded container of updating information.

16. The system according to claim 15 wherein the condition comprises at least one error associated with the downloaded container of updating information, or an error-free condition of the downloaded container of updating information.

17. The system according to claim 16 wherein if the condition comprises an error-free condition, the repository device further prepares the updating information for delivery to the electronic devices.

18. The system according to claim 15 wherein the repository device one of:
delivers the determined condition to the source of updating information; and
notifies the source of updating information of the existence of the determined condition and allows the source of updating information to retrieve the determined condition.

19. The system according to claim 10 wherein the source of updating information comprises at least one of an originator the at least one of firmware and software in the electronic devices associated with the network and a manufacturer of the electronic devices associated with the network.

20. An ingestion interface comprising:
a computer-processor;
wherein the computer-processor is configured to:
register a source of updating information in response to a registration request from the source to the ingestion interface;
provide the source of updating information with authentication information in response to the registering, wherein the source of updating information employs the authentication information when requesting a transfer of a container of updating information into a carrier network, wherein electronic devices are associated with the carrier network;
facilitate secure downloading of the container of updating information into the carrier network from the source of updating information; and
wherein the container of updating information is configured to update at least one of firmware and software in the associated electronic devices via the carrier network.

21. The ingestion interface according to claim 20 wherein the updating information comprises executable commands that convert the at least one of firmware and software in the associated electronic devices from a first version to a second version.

22. The ingestion interface according to claim 20 wherein the source of updating information comprises at least one of an originator of the at least one of firmware and software and a manufacturer of the associated electronic devices associated with the carrier network.

23. The method according to claim 1, comprising:
downloading the container from the source to the network only if the source is authenticated to the network.

24. The method according to claim 1, wherein the container is downloaded from the source into a repository in the network, the method further comprising:
delivering at least some of the updating information from the repository device to a plurality of the electronic devices.

25. The method according to claim 6, comprising:
the network providing the determined condition to the source in response to a retrieval request received by the network from the source.

26. The method according to claim 25, wherein the source comprises a plurality of sources, and wherein the request to transfer the container is issued to the network by a first one of the sources and the retrieval request is issued to the network by a second one of the sources.

27. The system according to claim 10, wherein the container is downloaded from the source to the network only if the source is authenticated to the network.

28. The system according to claim 10, wherein at least some of the updating information from the repository device is delivered to a plurality of the electronic devices by a device management server in the network, the server coupled to the repository device.

29. The system according to claim 10, wherein the network provides the determined condition to the source in response to a retrieval request received by the network from the source.

30. The system according to claim 29, wherein the source comprises a plurality of sources, and wherein the request to transfer the container is issued to the network by a first one of the sources and the retrieval request is issued to the network by a second one of the sources.

* * * * *

UNITED STATES PATENT AND TRADEMARK OFFICE
CERTIFICATE OF CORRECTION

| | | |
|---|---|---|
| PATENT NO. | : 7,984,485 B1 | |
| APPLICATION NO. | : 11/047212 | |
| DATED | : July 19, 2011 | |
| INVENTOR(S) | : Bindu R. Rao et al. | |

It is certified that error appears in the above-identified patent and that said Letters Patent is hereby corrected as shown below:

In column 10, line 45, in Claim 19, after "originator" insert -- of --.

Signed and Sealed this
Twentieth Day of December, 2011

David J. Kappos
*Director of the United States Patent and Trademark Office*